US012366404B2

(12) United States Patent
Wang et al.

(10) Patent No.: US 12,366,404 B2
(45) Date of Patent: Jul. 22, 2025

(54) HEATING DEVICE AND REFRIGERATOR

(71) Applicant: HAIER SMART HOME CO., LTD., Shandong (CN)

(72) Inventors: Haijuan Wang, Qingdao (CN); Peng Li, Qingdao (CN)

(73) Assignee: HAIER SMART HOME CO., LTD., Shandong (CN)

( * ) Notice: Subject to any disclaimer, the term of this patent is extended or adjusted under 35 U.S.C. 154(b) by 1036 days.

(21) Appl. No.: 17/424,620

(22) PCT Filed: Jan. 17, 2020

(86) PCT No.: PCT/CN2020/072796
§ 371 (c)(1),
(2) Date: Jul. 21, 2021

(87) PCT Pub. No.: WO2020/151595
PCT Pub. Date: Jul. 30, 2020

(65) Prior Publication Data
US 2022/0099361 A1 Mar. 31, 2022

(30) Foreign Application Priority Data
Jan. 23, 2019 (CN) .......................... 201910064958.X

(51) Int. Cl.
*H05B 6/64* (2006.01)
*A23B 2/82* (2025.01)
(Continued)

(52) U.S. Cl.
CPC ................ *F25D 23/12* (2013.01); *A23B 2/82* (2025.01); *H05B 6/642* (2013.01); *H05B 6/688* (2013.01); *A23V 2002/00* (2013.01); *H05B 6/72* (2013.01)

(58) Field of Classification Search
CPC ..... A23L 3/365; A23V 2002/00; F25D 23/12; F25D 31/005; H05B 6/642; H05B 6/688;
(Continued)

(56) References Cited

U.S. PATENT DOCUMENTS 3,497,656 A * 2/1970 Staats .................. H05B 6/6482
219/757

FOREIGN PATENT DOCUMENTS

CN 102754522 A 10/2012
CN 106288626 A 1/2017
(Continued)

OTHER PUBLICATIONS

Translation of of CN207247702U, "Thawing apparatus and has refrigerator of this thawing apparatus", Apr. 17, 2018, by ProQuest. (Year: 2018).*

(Continued)

*Primary Examiner* — Quang T Van
(74) *Attorney, Agent, or Firm* — troutman pepper locke; Tim Tingkang Xia, Esq.

(57) ABSTRACT

Provided are a heating device and a refrigerator. The heating device includes: a cylinder body, in which a heating cavity is defined and configured to place an object to be processed; an electromagnetic generating module, configured to generate an electromagnetic wave signal; a radiating antenna, electrically connected with the electromagnetic generating module to generate electromagnetic waves of a corresponding frequency in the heating cavity according to the electromagnetic wave signal, so as to heat the object to be processed in the heating cavity; and a signal processing and measurement and control circuit, electrically connected with the electromagnetic generating module and disposed outside the cylinder body. The size of the available space inside the (Continued)

heating cavity is greatly increased, thereby increasing the space utilization rate of the heating cavity.

10 Claims, 7 Drawing Sheets

(51) Int. Cl.
    *F25D 23/12*     (2006.01)
    *H05B 6/68*     (2006.01)
    *H05B 6/80*     (2006.01)
    *H05B 6/72*     (2006.01)

(58) Field of Classification Search
    CPC ........ H05B 6/72; H05B 6/80; H05B 2206/02; H05B 6/12
    USPC ....... 219/679, 678, 680, 702, 703, 704, 705, 219/710, 711, 712, 716, 717, 757
    See application file for complete search history.

(56) References Cited

FOREIGN PATENT DOCUMENTS

| | | |
|---|---|---|
| CN | 207247702 U | 4/2018 |
| CN | 209893774 U | 1/2020 |
| CN | 209893780 U | 1/2020 |
| CN | 209897304 U | 1/2020 |
| CN | 209897305 U | 1/2020 |
| JP | 2005180721 A | 7/2005 |
| JP | 2013072618 A | 4/2013 |
| KR | 20060058519 A | 5/2006 |
| RU | 2332622 C2 | 8/2008 |
| RU | 2411429 C2 | 2/2011 |
| WO | WO 2011/135863 A1 | 11/2011 |
| WO | WO 2011/152047 A1 | 12/2011 |

OTHER PUBLICATIONS

International Search Report for PCT/CN2020/072796 (ISA/CN) dated Mar. 25, 2020 (6 pages).
1$^{st}$ Office Action for Australia Patent Application No. 2020212872 dated Apr. 20, 2022 (3 pages).
1$^{st}$ Office Action for EP Application No. 20745742.5 dated Feb. 14, 2022 (6 pages).
1$^{st}$ Office Action for India Patent Application No. 202137034679 dated Mar. 16, 2022 w/English translation (6 pages).
1$^{st}$ Office Action for Russia Patent Application No. 2021122572 dated Dec. 24, 2021 w/English translation (9 pages).
Supplementary European Search Report for EP Application No. 20745742.5 dated Feb. 2, 2022 (4 pages).
Search Report for Russia Patent Application No. 2021122572 dated Dec. 2, 22021w/English translation (4 pages).

\* cited by examiner

HEATING DEVICE AND REFRIGERATOR

CROSS-REFERENCE TO RELATED APPLICATIONS

The present application is a national phase entry of International Application No. PCT/CN2020/072796, filed Jan. 17, 2020, which claims priority to Chinese Patent Application No. 201910064958.X, filed Jan. 23, 2019, which are incorporated herein by reference in their entirety.

TECHNICAL FIELD

The present invention relates to the field of food heating, and particularly relates to a heating device and a refrigerator with the heating device.

BACKGROUND ART

In the freezing process of food, the quality of the food is maintained, but the frozen food needs to be heated before processing or eating. In order to facilitate a user freezing and heating the food, in the prior art, the food is generally heated by disposing a heating device or a microwave device in a refrigerator. However, if the food is heated by the heating device, the heating time is generally long, and the heating time and temperature are not easy to control, which is easy to cause water evaporation and juice loss of the food, thereby resulting in quality loss of the food. If the food is heated by the microwave device, the heating speed is fast and the heating efficiency is high, so that the loss of nutrients in the food is very low. However, due to the difference in penetration of microwaves to water and ice and absorption of water and ice to microwaves and the uneven distribution of internal substances of the food, the melted area absorbs a lot of energy, which is prone to uneven heating and local overheating.

In order to avoid the above problems, the applicant of the present application previously proposed an electromagnetic heating mode with a good heating effect. However, the previous electromagnetic heating device will occupy too much heating space, and the heat generated by the electromagnetic heating device itself is not easy to dissipate, thereby affecting the heating effect.

SUMMARY OF THE INVENTION

An objective of the first aspect of the present invention aims to overcome at least one of the defects in the prior art and provide a heating device with a large heating space and a high space utilization rate.

Another objective of the first aspect of the present invention is to improve the heating uniformity of the heating device.

A further objective of the first aspect of the present invention is to quickly reduce the temperature of a heating component of the heating device, so as to improve the heating efficiency and the heating effect.

An objective of the second aspect of the present invention is to provide a refrigerator with the above-mentioned heating device.

According to the first aspect of the present invention, the present invention provides a heating device, including:
  a cylinder body, in which a heating cavity is defined and configured to place an object to be processed;
  an electromagnetic generating module, configured to generate an electromagnetic wave signal;
  a radiating antenna, electrically connected with the electromagnetic generating module to generate electromagnetic waves of a corresponding frequency in the heating cavity according to the electromagnetic wave signal, so as to heat the object to be processed in the heating cavity; and
  a signal processing and measurement and control circuit, electrically connected with the electromagnetic generating module and disposed outside the cylinder body.

Optionally, the cylinder body is formed by an upper cover, a bottom plate, a rear cover and two lateral side plates, so that the heating cavity defined in the cylinder body is provided with a front side opening;
  the heating device further includes a door body configured to open and close the front side opening; and
  the signal processing and measurement and control circuit is located on a rear side of the rear cover.

Optionally, a housing plate is disposed on the rear side of the rear cover, an accommodating cavity is defined between the housing plate and the rear cover, and the signal processing and measurement and control circuit is disposed in the accommodating cavity; and
  through holes are formed on a rear plate of the housing plate opposite to the rear cover so as to allow heat generated by the signal processing and measurement and control circuit to be dissipated by the through holes.

Optionally, the heating device is placed behind a storage compartment of the refrigerator, the rear plate of the housing plate is adjacent to an air supply duct of the refrigerator, and the through holes on the rear plate are communicated with the air supply duct, so as to quickly reduce a temperature of the signal processing and measurement and control circuit by a cooling air flow in the air supply duct.

Optionally, the signal processing and measurement and control circuit is integrated on a circuit board.

Optionally, the circuit board is fixed on a rear surface of the rear cover by screws, and the rear cover is tightly connected with the bottom plate, the upper cover and the two lateral side plates by screws.

Optionally, the door body includes a metal end plate configured to block the front side opening to seal the heating cavity and conductive connectors electrically connected with the metal end plate, and the conductive connectors are configured to be electrically connected with the cylinder body at least when the door body is in a closed state in which the door body seals the front side opening, so that when the door body is in the closed state, the cylinder body and the door body form a continuously conductive shielding body.

Optionally, the heating device further includes:
  an antenna housing, disposed in the cylinder body and configured to separate an inner space of the cylinder body into a heating chamber and an electrical appliance chamber, wherein the object to be processed and the radiating antenna are respectively disposed in the heating chamber and the electrical appliance chamber.

According to the second aspect of the present invention, the present invention further provides a refrigerator, including:
  a cabinet, in which at least one storage compartment is defined; and
  any one of the above-mentioned heating devices, disposed in one of the storage compartments.

Optionally, a compressor bin configured to place a compressor is further defined in the cabinet; and
  the electromagnetic generating module of the heating device is disposed in the compressor bin and is connected with the signal processing and measurement and control circuit by a radio frequency cable and a signal transmission cable, and then is electrically connected with an antenna pole plate by the signal processing and measurement and control circuit.

The heating device of the present invention uses a radio frequency heating mode to heat the object to be processed, and the heating effect is relatively good. Furthermore, the signal processing and measurement and control circuit is disposed outside the cylinder body and does not occupy the space of the heating cavity inside the cylinder body, so that the size of the available space inside the heating cavity is greatly increased, thereby increasing the space utilization rate of the heating cavity.

At the same time, the signal processing and measurement and control circuit is disposed outside the cylinder body, which may also prevent the heat generated by the signal processing and measurement and control circuit during operation (such as the heat emitted by an inductor of the signal processing and measurement and control circuit) from entering the heating cavity and being transferred to the object to be processed, thereby improving the heating uniformity.

Further, the signal processing and measurement and control circuit is disposed in the accommodating cavity formed between the rear cover of the cylinder body and a housing plate, and the through holes on the housing plate are communicated with the air supply duct of the refrigerator, so that the accommodating cavity is communicated with the air supply duct. Therefore, the cooling air flow with a low temperature in the air supply duct may be used to quickly dissipate heat to reduce the temperature of the heating component of the signal processing and measurement and control circuit, so as to ensure that the performance of the signal processing and measurement and control circuit is not affected by a high temperature, thereby improving the heating efficiency and heating effect of the heating device.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Firstly, the present invention provides a heating device configured to heat an object to be processed. The heating device may be used in refrigerating and freezing devices such as refrigerators, and may also be used alone.

Figure 1:
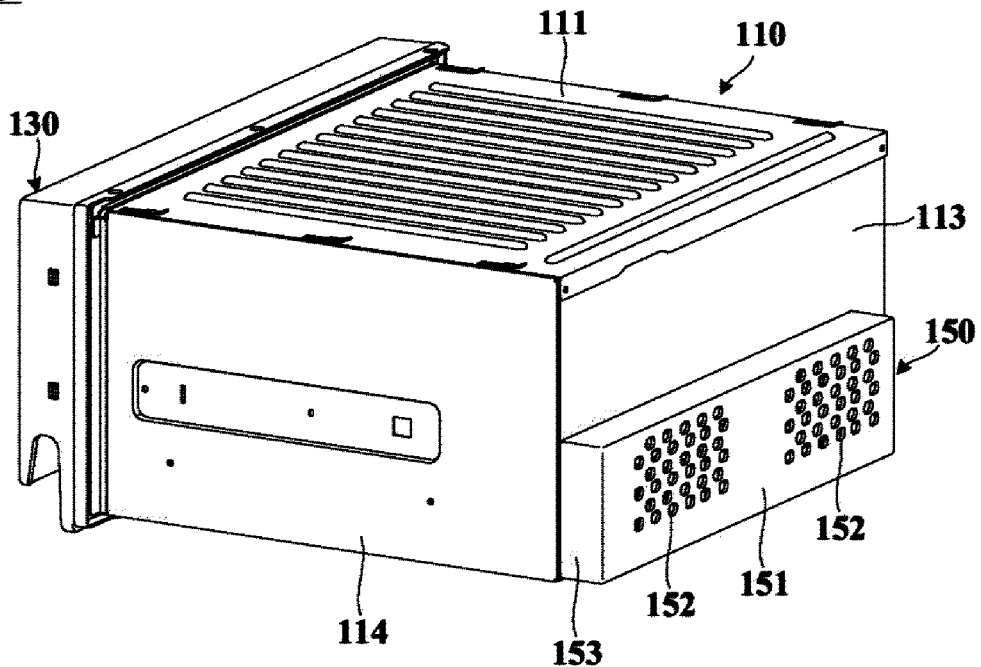
FIG. 1 is a schematic structural view of a heating device according to one embodiment of the present invention.
Figure 2:
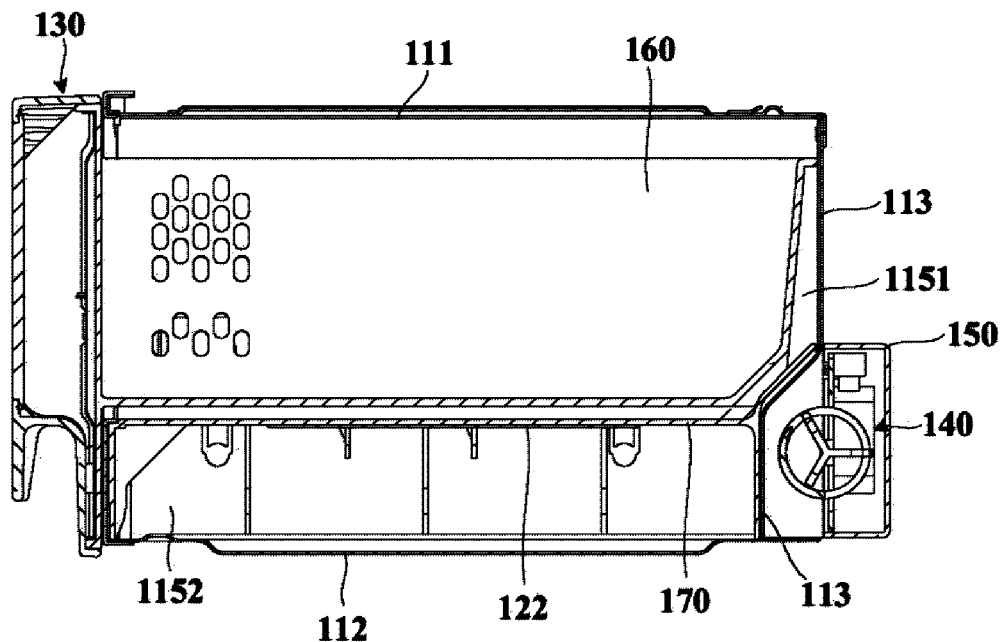
FIG. 2 is a schematic sectional view of a heating device according to one embodiment of the present invention.
Figure 3:
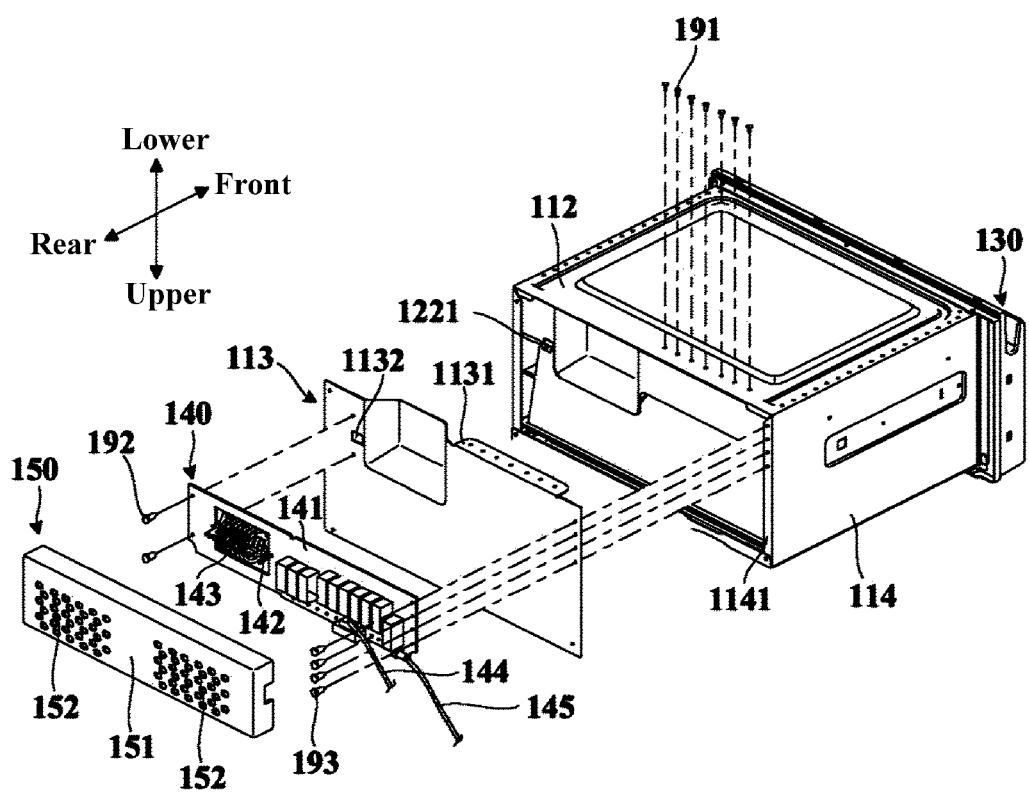
FIG. 3 is a schematic exploded view of a heating device according to one embodiment of the present invention.
Figure 4:
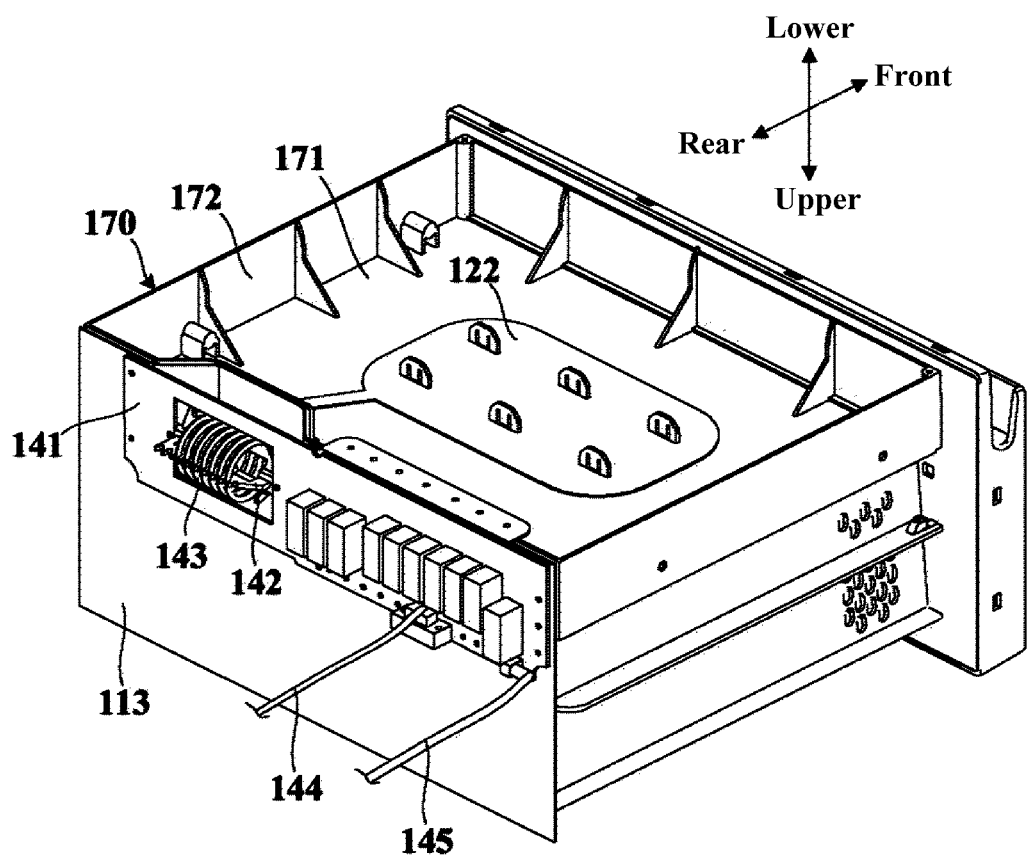
FIG. 4 is a schematic structural view of a heating device after a part of cylinder body structure is hidden, according to one embodiment of the present invention.

FIG. 1 is a schematic structural view of a heating device according to one embodiment of the present invention. FIG. 2 is a schematic sectional view of a heating device according to one embodiment of the present invention. FIG. 3 is a schematic exploded view of a heating device according to one embodiment of the present invention. FIG. 4 is a schematic structural view of a heating device after a part of cylinder body structure is hidden, according to one embodiment of the present invention. In order to facilitate observation and understanding, the heating device in FIG. 3 and FIG. 4 is in an inverted state, and the front, rear, upper and lower orientations in FIG. 3 and FIG. 4 indicate the orientations of the heating device in a normal use state. Referring to FIG. 1 to FIG. 3, a heating device 10 of the present invention includes a cylinder body 110, an electromagnetic generating module 121 (referring to FIG. 5), a radiating antenna 122 and a signal processing and measurement and control circuit 140.

A heating cavity configured to place an object to be processed is defined in the cylinder body 110. The electromagnetic generating module 121 is configured to generate electromagnetic signals. The radiating antenna 122 is electrically connected with the electromagnetic generating module 121 to generate electromagnetic waves of corresponding frequencies in the heating cavity according to the electromagnetic signals generated by the electromagnetic generating module 121, so as to heat the object to be processed in the heating cavity. The signal processing and measurement and control circuit 140 is electrically connected with the electromagnetic generating module 121, is disposed outside the cylinder body 110, and is configured to detect and adjust the specific features of the electromagnetic waves generated by the electromagnetic generating module 121. The specific features of the electromagnetic waves may include power of incident waves and power of reflected waves. The heating device 10 of the present invention uses a radio frequency heating mode to heat the object to be processed, and the heating effect is relatively good. The electromagnetic waves generated by the electromagnetic generating module 121 may be radio frequency waves, microwaves and other electromagnetic waves having a suitable wavelength. Such a mode of heating the object to be processed by electromagnetic waves is high in heating efficiency and uniform in heating, and can ensure the food quality.

Specifically, the signal processing and measurement and control circuit 140 is disposed outside the cylinder body 110 and does not occupy the space of the heating cavity inside the cylinder body 110, so that the size of the available space inside the heating cavity is greatly increased, thereby increasing the space utilization rate of the heating cavity. At the same time, the signal processing and measurement and control circuit 140 is disposed outside the cylinder body 110, which may also prevent the heat generated by the signal processing and measurement and control circuit 140 during operation (such as the heat emitted by an inductor of the signal processing and measurement and control circuit) from entering the heating cavity and being transferred to the object to be processed, thereby improving the heating uniformity.

Further, the cylinder body 110 may be made of metals to serve as a receiving pole to receive electromagnetic waves generated by the radiating antenna 122.

In some embodiments, the cylinder body 110 is formed by an upper cover 111, a bottom plate 112, a rear cover 113 and two lateral side plates 114, so that the heating cavity defined in the cylinder body is provided with a front side opening. Further, the heating device 10 also includes a door body 130 configured to open and close the front side opening of the heating cavity. The door body 130 may be installed together with the cylinder body 110 by an appropriate method.

Further, the signal processing and measurement and control circuit 140 is located on the rear side of the rear cover 113. That is, the signal processing and measurement and control circuit 140 is located on the outer side of the rear cover 113. Therefore, the signal processing and measurement and control circuit 140 may be prevented from being exposed to the front side or both left and right sides, thereby improving the visual aesthetic effect of the heating device 10. Furthermore, after the heating device 10 is placed in a refrigerator, the signal processing and measurement and control circuit 140 may be prevented from occupying the side, upper or lower space of a storage compartment of the refrigerator, and the signal processing and measurement and control circuit 140 may also be closer to an air supply duct on the rear side of the refrigerator, thereby being conducive to heat dissipation.

In some embodiments, a housing plate 150 may be disposed on the rear side of the rear cover 113, an accommodating cavity is defined between the housing plate 150 and the rear cover 113, and the signal processing and measurement and control circuit 140 is disposed in the accommodating cavity between the housing plate 150 and the rear cover 113 to prevent the signal processing and measurement and control circuit 140 from being exposed to the outside of the cylinder body 110 and easily affected or damaged Specifically, the housing plate 150 may be connected to the bottom of the rear side of the rear cover 113, so that the signal processing and measurement and control circuit 140 is located at the bottom of the rear side of the rear cover 113 so as to be electrically connected with the radiating antenna 122 (detailed later) disposed at the bottom of the heating cavity.

Further, through holes 152 are formed on a rear plate 151 of the housing plate 150 opposite to the rear cover 113 so as to allow the heat generated by the signal processing and measurement and control circuit 140 to be dissipated by the through holes 152, thereby ensuring that the signal processing and measurement and control circuit 140 is located in a relatively closed space, and that the signal processing and measurement and control circuit 140 can dissipate heat normally. The housing plate 150 may further include circumferential side plates 153 connected with the rear cover 113.

Figure 5:
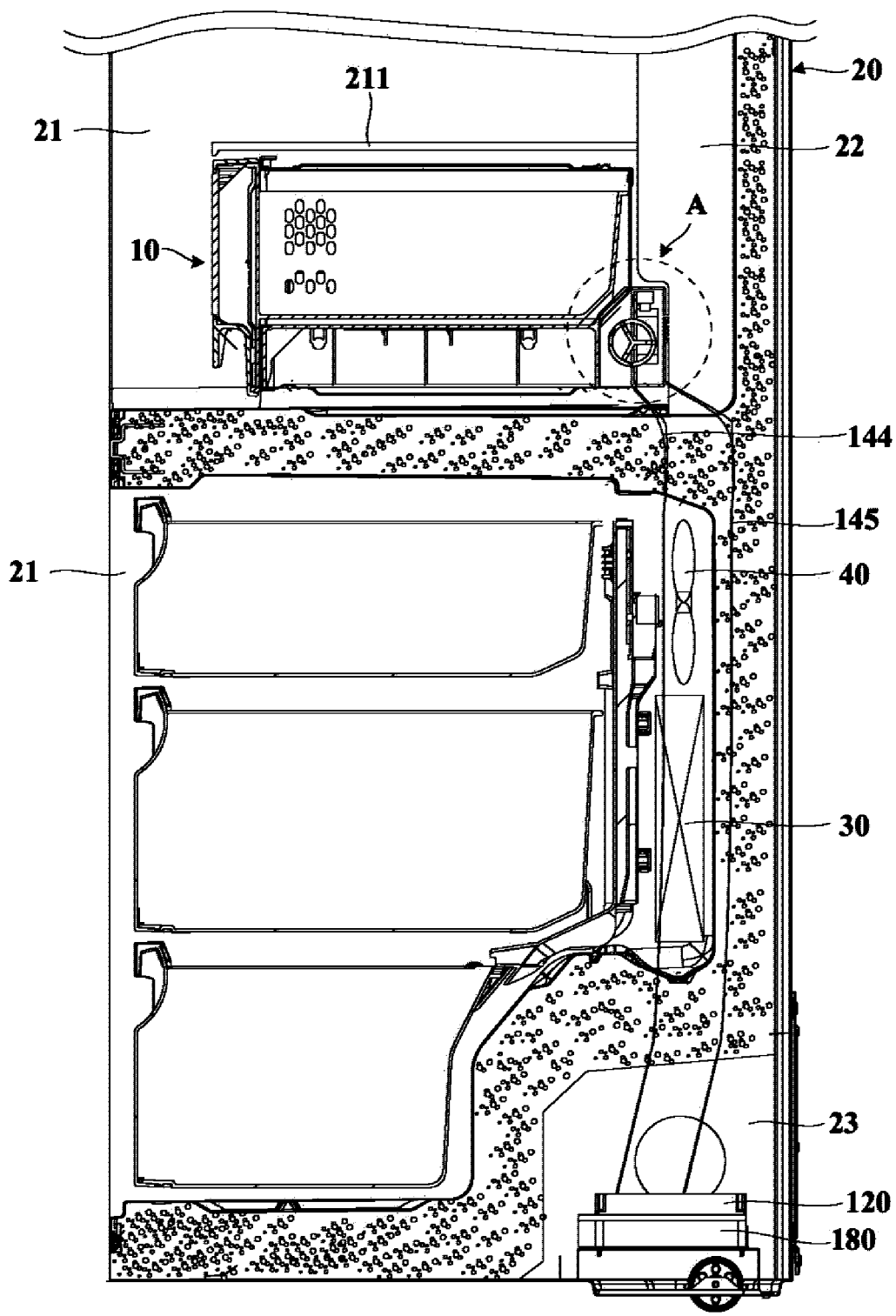
FIG. 5 is a schematic structural view of a heating device applied to a refrigerator, according to one embodiment of the present invention.
Figure 6:
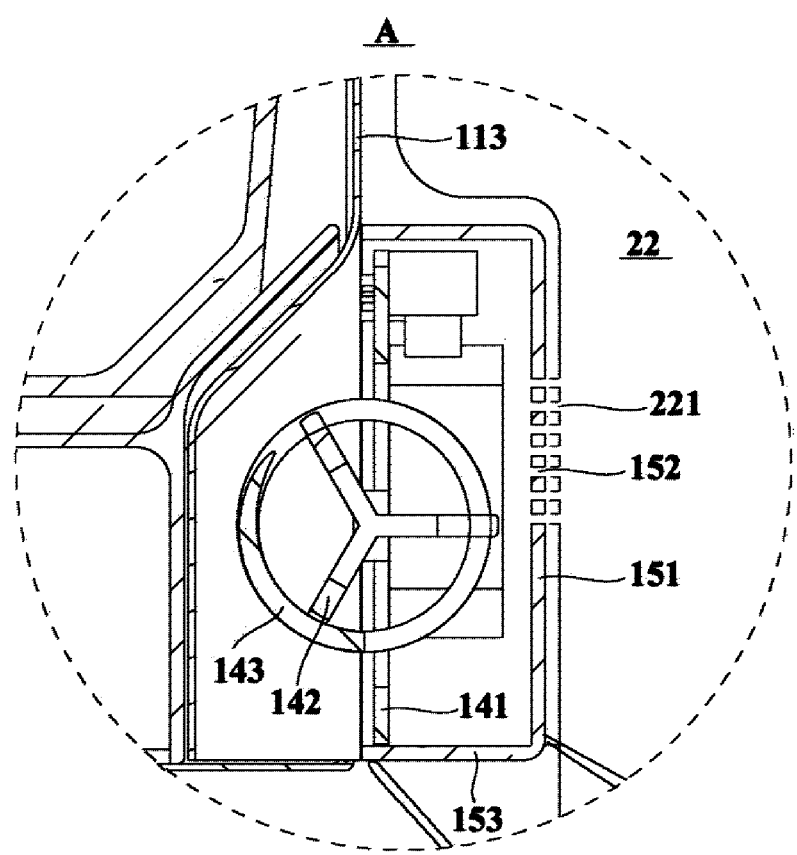
FIG. 6 is a schematic enlarged view of a part A in FIG. 5.

FIG. 5 is a schematic structural view of a heating device applied to a refrigerator, according to one embodiment of the present invention. FIG. 6 is a schematic enlarged view of a part A in FIG. 5. In some embodiments, after the heating device 10 is applied to a refrigerator 1 and placed in a storage compartment of the refrigerator 1, the rear plate 151 of the housing plate 150 is adjacent to an air supply duct 22 of the refrigerator 1, and the through holes 152 on the rear plate 151 are communicated with the air supply duct 22, so that the cooling air flow in the air supply duct 22 may quickly reduce the temperature of the signal processing and measurement and control circuit 140. The through holes 152 on the housing plate 150 are communicated with the air supply duct 22 of the refrigerator, so that the accommodating cavity in which the signal processing and measurement and control circuit 140 is located may be communicated with the air supply duct 22. Therefore, the cooling air flow with a relatively low temperature in the air supply duct 22 may be used to quickly dissipate heat to reduce the temperature of a heating component (such as an inductance coil 143) of the signal processing and measurement and control circuit 140, so as to ensure that the performance of the signal processing and measurement and control circuit 140 is not affected by a high temperature, thereby improving the heating efficiency and heating effect of the heating device 10.

Specifically, the region of the air supply duct 22 opposite to the housing plate 150 may be provided with a plurality of air vents 221, and the plurality of air vents are communicated with the through holes 152 on the housing plate 150, so that the accommodating cavity in which the signal processing and measurement and control circuit 140 is located is communicated with the air supply duct 22, so as to allow the cooling air flow in the air supply duct 22 to flow to the accommodating cavity to dissipate heat to reduce the temperature of the signal processing and measurement and control circuit 140. Further, the through holes 152 on the housing plate 150 may be divided into air inlet holes and air outlet holes, and the air vents on the air supply duct 22 may be divided into air inlet vents and air return vents. The air inlet vents on the air supply duct 22 are communicated with the air inlet holes on the housing plate 150, and the air return vents on the air supply duct 22 are communicated with the air return holes on the housing plate 150. The air inlet holes and air return holes on the housing plate 150 may be disposed separately, for example, may be located in left and right regions of the rear plate 151 respectively, so that inlet air and return air do not interfere with each other.

In some embodiments, the signal processing and measurement and control circuit 140 may be integrated on a circuit board 141 to facilitate the installation and maintenance of the signal processing and measurement and control circuit.

Further, the circuit board 141 may be fixed on the rear surface of the rear cover 113 by screws. Specifically, the signal processing and measurement and control circuit 140 may include an inductance support 142 disposed on the circuit board 141, an inductance coil 143 wound on the inductance support 142, a relay, a capacitor, and the like. The circuit board 141 may be fixed on the rear surface of the rear cover 113 by second screws 192 and kept flush with the rear cover 113. The inductance coil 143 is configured to couple with the radiating antenna 122, thereby achieving the purpose of receiving signals quickly. The rear cover 113 is tightly connected with the bottom plate 112, the upper cover 111 and the two lateral side plates 114 by screws.

Figure 7:
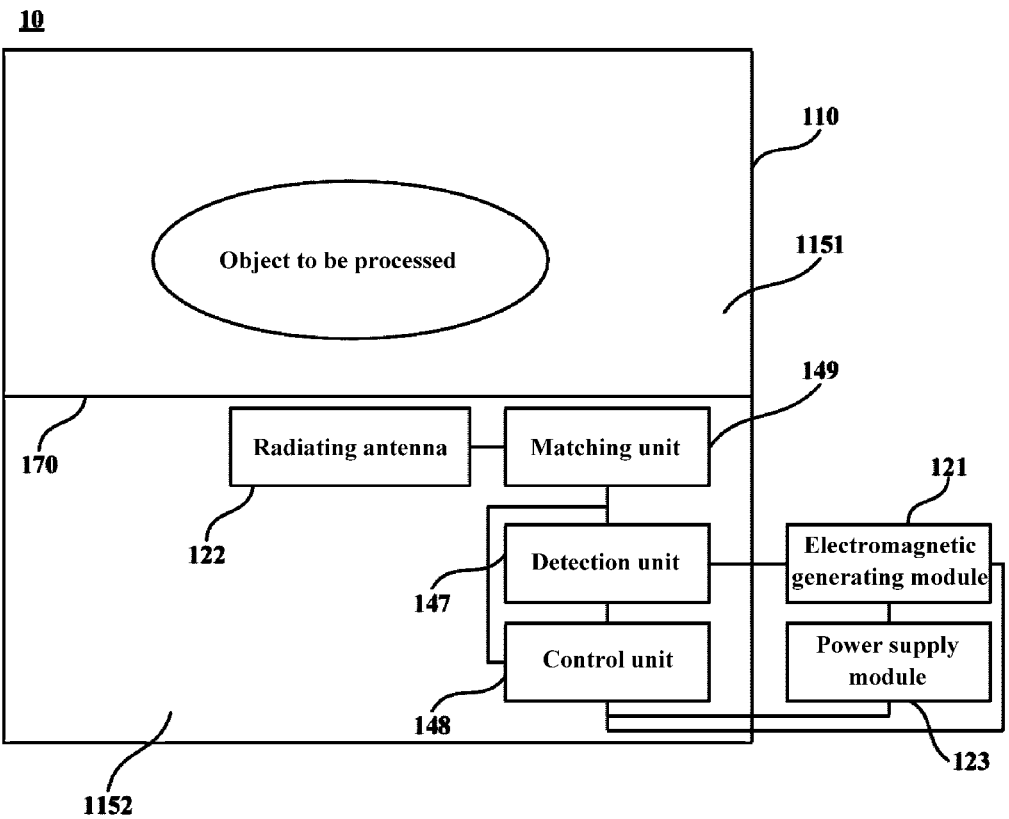
FIG. 7 is a schematic structural block diagram of a heating device according to one embodiment of the present invention.

FIG. 7 is a schematic structural block diagram of a heating device according to one embodiment of the present invention. In some embodiments, the electromagnetic heating device further includes a power supply module 123, and the power supply module 123 may be configured to be electrically connected with the electromagnetic generating module 121 to provide electric energy to the electromagnetic generating module 121, so that the electromagnetic generating module 121 generates electromagnetic wave signals.

The signal processing and measurement and control circuit 140 may include a detection unit 147, a control unit 148 and a matching unit 149.

The detection unit 147 may be connected in series between the electromagnetic generating module 121 and the radiating antenna 122, and is configured to detect in real time the specific parameters of incident wave signals and reflected wave signals passing through the detection unit.

The control unit 148 may be configured to acquire the specific parameters from the detection unit 147, and calculate the power of incident waves and reflected waves according to the specific parameters. In the present invention, the specific parameters may be voltage values and/or current values. Alternatively, the detection unit 147 may be a power meter to directly measure the power of incident waves and reflected waves.

The control unit 148 may further calculate an electromagnetic wave absorption rate of the object to be processed according to the power of incident waves and reflected waves, compare the electromagnetic wave absorption rate with a preset absorption threshold, and send an adjusting command to the matching unit 149 when the electromagnetic wave absorption rate is less than the preset absorption threshold. The preset absorption threshold may be 60% to 80%, such as 60%, 70% or 80%.

The matching unit 149 may be connected in series between the electromagnetic generating module 121 and the radiating antenna 122, and is configured to adjust a load impedance of the electromagnetic generating module 121 according to an adjusting command of the control unit 148, so as to improve the matching degree between the output impedance and the load impedance of the electromagnetic generating module 121, so that when foods with different fixed attributes (such as type, weight and volume) are placed in a heating chamber 111, or during the temperature change of the foods, relatively more electromagnetic wave energy is radiated in the heating chamber 111, thereby increasing the heating rate.

Figure 8:
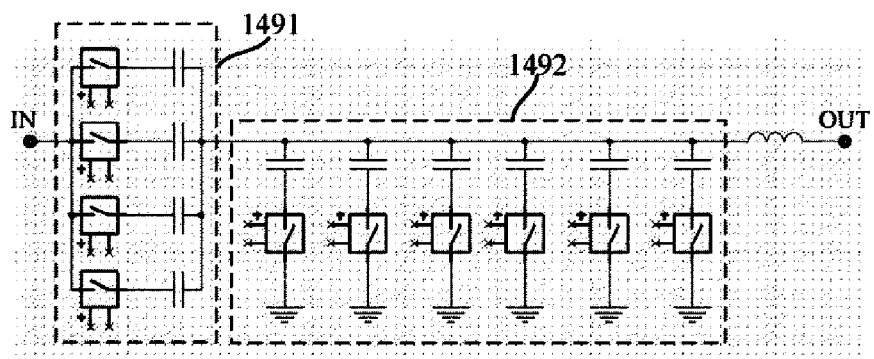
FIG. 8 is a schematic circuit diagram of a matching unit according to one embodiment of the present invention.

FIG. 8 is a schematic circuit diagram of a matching unit according to one embodiment of the present invention. Referring to FIG. 8, the matching unit 149 may include a matching module 1491, a matching module 1492 and a fixed value inductor. The matching module 1491 may include a plurality of parallel branches, and the input ends of the plurality of branches may be configured to be electrically connected with the electromagnetic generating module 121. The fixed value inductor may be connected in series between the output end of the matching module 1491 and the radiating antenna 122. The matching module 1492 may also include a plurality of parallel branches, the input ends of the plurality of branches may be connected in series between the matching module 1491 and the fixed value inductor, and the output ends of the plurality of branches may be configured to be grounded.

In the electromagnetic wave generating device of the present invention, since two matching modules respectively including a plurality of parallel branches are connected in series between the electromagnetic generating module and the radiating assembly, and one end of the matching module far away from the output end of the electromagnetic generating module is grounded, a load combination that is several times the sum of the number of the parallel branches of the two matching modules can be realized. Compared with the technical solution of adjusting the spacing between a radiating unit and a receiving pole by a mechanical electric motor structure in the prior art, the present invention is not only lower in cost, but also higher in reliability and faster in response speed. Compared with the technical solution of adjusting the load impedance by variable capacitors and variable inductors in the prior art, the present invention is not only lower in cost, but also higher in reliability and wider in adjusting range.

In some embodiments, each parallel branch of the matching module 1491 may include a fixed value capacitor and a switch connected in series. Each parallel branch of the matching module 1492 may include a fixed value capacitor and a switch connected in series.

The plurality of switches of the matching module 1491 and the matching module 1492 may be respectively or together integrated into an array type switch assembly to facilitate the on-off control of the switches.

In some embodiments, each parallel branch of the matching module 1492 may also include a fixed value capacitor having one end connected in series between the output end of the matching module 1491 and the radiating antenna 122, and the other end electrically connected with the input end of the capacitor of this parallel branch, so as to improve the matching accuracy of the matching unit 149 and reduce errors.

Figure 9:
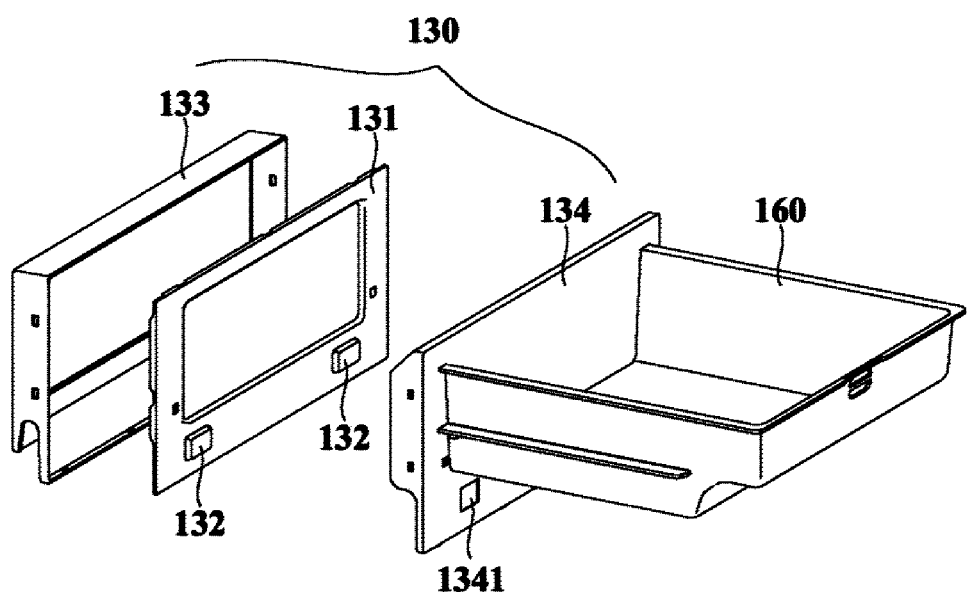
FIG. 9 is a schematic structural exploded view of a door body according to one embodiment of the present invention.

FIG. 9 is a schematic structural exploded view of a door body according to one embodiment of the present invention. For ease of understanding, FIG. 9 also shows a drawer 160. In some embodiments, the door body 130 includes a metal end plate 131 configured to block the above-mentioned front side opening to seal the heating cavity and conductive connectors 132 electrically connected with the metal end plate 131, and the conductive connectors 132 are configured to be electrically connected with the cylinder body 110 at least when the door body 130 is in a closed state in which the door body seals the above-mentioned front side opening, so that when the door body 130 is in a closed state, the cylinder body 110 and the door body 130 form a continuously conductive shielding body. Therefore, even if a gap still exists between the cylinder body 110 and the door body 130 when the door body 130 is in a closed state, it still can be ensured that an electrical connection is formed between the cylinder body 110 and the door body 130 so as to form a continuously conductive shielding body during heating, thereby preventing the electromagnetic waves from being emitted through the gap, effectively shielding the electromagnetic radiation, and eliminating the harm of the electromagnetic radiation to the human body.

Specifically, the conductive connectors 132 may directly use metal bumps, conductive adhesive strips or other suitable conductive connectors. The conductive connectors 132 may be in direct electrostatic contact with the front surface of the cylinder body 110, or may be in electrical contact with other structures (such as sliding rails) of the cylinder body 110.

When the door body 130 is in a closed state, the metal end plate 131 of the door body 130 is electrically connected with the cylinder body 110, and the screws configured to tightly connect the rear cover 113, the bottom plate 112, the upper cover 111 and the two lateral side plates 114 together have electrical conductivity. Therefore, after a heating function is enabled, the door body 130 and the cylinder body 110 may form a continuously conductive shielding body, that is, a Faraday cage, so as to prevent the electromagnetic waves from being emitted to effectively shield the radiation.

Specifically, the bottom edge of the rear cover 113 may be provided with a rear cover flange 1131 extending forward, and the rear cover flange 1131 is provided with screw connecting holes. The rear cover flange 1131 is attached to the upper surface of the bottom plate 112, and correspondingly, the bottom plate 112 is also provided with screw connecting holes in corresponding positions, so that the rear cover 113 and the bottom plate 112 are tightly connected together by first screws 191 passing through the screw connecting holes on the rear cover flange 1131 and the bottom plate 112. The rear side edge of at least one of the lateral side plates 114 is provided with a side plate flange 1141 extending toward the middle, and the side plate flange 1141 is provided with screw connecting holes. The side plate flange 1141 is attached to the front surface of the rear cover 113, the side edge of the rear cover 113 is also provided with screw connecting holes in corresponding positions, and the side edge of the circuit board 141 is also provided with screw connecting holes in corresponding positions, so that the circuit board 141, the rear cover 113 and the lateral side plates 114 are tightly connected together by third screws 193 passing through the screw connecting holes on the circuit board 141, the rear cover 113 and the side plate flange 1141 in sequence. The bottom plate 112 is provided with screw connecting holes near two lateral edges respectively, and the bottoms of the two lateral side plates 114 are also provided with screw connecting holes respectively, so that the bottom plate 112 and the two lateral side plates 114 are tightly connected together by screws passing through the screw connecting holes near the lateral edge of the bottom plate 112 and at the bottoms of the lateral side plates 114.

The heating device 10 further includes a drawer 160 for carrying an object to be processed, and the drawer 160 is connected to the rear side of the door body 130 and is disposed in the cylinder body 110 in a push-and-pull manner through a pick-and-place opening.

Further, the door body 130 also includes a front end cover 133 and a rear end plate 134 disposed front and rear, the rear end plate 134 and the drawer 160 are integrally formed or fixedly connected, and the metal end plate 131 is located between the front end cover 133 and the rear end plate 134. Therefore, a user will not touch the metal end plate 131 when operating the door body 130, which further improves the safety of the heating device 10 in use. The rear end plate 134 may be provided with through holes 1341 to allow the conductive connectors 132 to be exposed backward by the through holes 1341 so as to be electrically connected with the cylinder body 110.

In some embodiments, the heating device 10 also includes an antenna housing 170 which is disposed in the cylinder body 110 and configured to separate the heating cavity inside the cylinder body 110 into a heating chamber 1151 and an electrical appliance chamber 1152, wherein the object to be processed and the radiating antenna 122 are respectively disposed in the heating chamber 1151 and the electrical appliance chamber 1152 to separate the object to be processed from the radiating antenna 122, thereby preventing the radiating antenna 122 from being exposed after the drawer 160 is pulled out to affect the use experience of the user, and meanwhile avoiding the radiating antenna 122 from being dirty or damaged by accidental touch.

Further, the antenna housing 170 may be disposed at the bottom inside the cylinder body 110, and includes a clapboard 171 extending horizontally and a skirt part 172 extending downward from the peripheral edge of the clapboard 171. The skirt part 172 may be fixedly connected with the cylinder body 110. The radiating antenna 122 may be fixed on the lower side of the clapboard by engaging or other suitable modes. The radiating antenna 122 may also be used as a liquid metal material to be directly electroplated on the clapboard.

The radiating antenna 122 is provided with a joint 1221 configured to be electrically connected with the signal processing and measurement and control circuit 140, and the joint 1221 may be located at the end of an extended end of the radiating antenna 122. The rear cover 113 is provided with a wire hole 1132, and the joint 1221 of the radiating antenna 122 is exposed through the wire hole 1132 and is electrically connected with the circuit board 141 of the signal processing and measurement and control circuit 140. The signal processing and measurement and control circuit 140 is connected with the electromagnetic generating module 121 by a radio frequency cable 144 and a signal transmission cable 145. The radio frequency cable 144 and the signal transmission cable 145 may extend out from the circuit board 141. The radio frequency signal generated by the electromagnetic generating module 121 may be transmitted to the circuit board 141 by the radio frequency cable 144, and then transmitted to the radiating antenna 122 by the circuit board 141.

The electromagnetic generating module 121 may be located outside the cylinder body 110 to facilitate the heat dissipation of the electromagnetic generating module 121 and prevent the heat generated by the electromagnetic generating module 121 from affecting the object to be processed.

Based on the heating device 10 according to any one of the above-mentioned embodiments, the present invention also provides a refrigerator. Referring to FIG. 5 and FIG. 6, the refrigerator 1 of the present invention includes a cabinet 20, and at least one storage compartment 21 is defined in the cabinet 20. The refrigerator 1 further includes compartment door bodies configured to respectively open and close the pick-and-place opening of each storage compartment, a refrigerating system, and the like.

Specifically, the refrigerator 1 further includes the heating device 10 described in any one of the above-mentioned embodiments, which is disposed in one of the storage compartments 21. The object to be processed, taken out from a freezing compartment of the refrigerator, may be heated by the heating device 10, so that the heating effect is good, and the use is convenient.

In some embodiments, a compressor bin 23 configured to place a compressor is also defined in the cabinet 20. The compressor bin 23 is usually located at the bottom of the rear side of the cabinet 20 and is defined by a shell of the cabinet 20 and a bottom steel assembly. The electromagnetic generating module 121 is disposed in the compressor bin 23 and is connected with the signal processing and measurement and control circuit 140 by the radio frequency cable 144 and the signal transmission cable 145, and then is electrically connected with the radiating antenna 122 by the signal processing and measurement and control circuit 140.

Further, a radio frequency support 180 is also disposed in the compressor bin 23, and the electromagnetic generating module 121 is supported on the radio frequency support 180.

Further, the refrigerator 1 may be an air-cooled refrigerator (it is well-known to those skilled in the art that the air-cooled refrigerator refers to a refrigerator, in which an evaporator 30 in the refrigerating system is disposed in a compartment air supply duct sandwiched between an air duct cover plate and the inner walls of the storage compartment, and air supply fan 40 is configured to force the air in the storage compartment to perform a convective heat exchange with the evaporator 30). The refrigerator 1 may be provided with a plurality of storage compartments. For example, two storage compartments, i.e., a refrigerating compartment at the upper side and a freezing compartment at the lower side may be defined in the cabinet 10. The refrigerating compartment refers to a storage compartment, in which the storage temperature of food materials is 0° C. to 8° C. The freezing compartment refers to a storage compartment, in which the storage temperature of food materials is −20° C. to −15° C. The cabinet 10 further defines an air supply duct 22 configured to convey the cooling air flow into the storage compartment 21, and the air supply duct 22 may include a refrigerating air supply duct and a freezing air supply duct. The heating device 10 may be disposed in the refrigerating compartment and located under a shelf 211. The rear side of the heating device 10 is adjacent to the refrigerating air supply duct. The housing plate 150 of the heating device 10 may abut against the air duct walls of the refrigerating air supply duct, so that the through holes 152 on the housing plate 150 are communicated with the air vents 221 of the refrigerating air supply duct, so as to facilitate fast heat dissipation of the signal processing and measurement and control circuit 140 of the heating device 10.

Those skilled in the art should understand that unless otherwise specified, the terms "top", "bottom", "inner", "outer", "lateral", "front", "rear", etc. used to represent the orientation or position relationship in the embodiments of the present invention are based on the actual use state of the heating device 10 and the refrigerator 1. These terms are only for facilitating the description and understanding of the technical solutions of the present invention, rather than indicating or implying that the device or component referred to must have a specific orientation, and therefore cannot be understood as limiting the present invention.

Hereto, those skilled in the art should realize that although multiple exemplary embodiments of the present invention have been shown and described in detail herein, without departing from the spirit and scope of the present invention, many other variations or modifications that conform to the principles of the present invention may still be directly determined or deduced from the contents disclosed in the present invention. Therefore, the scope of the present invention should be understood and recognized as covering all these other variations or modifications.

The invention claimed is:

1. A heating device, comprising:
   a cylinder body, in which a heating cavity is defined and configured to place an object to be processed;
   an electromagnetic generating module, configured to generate an electromagnetic wave signal;
   a radiating antenna, electrically connected with the electromagnetic generating module to generate electromagnetic waves of a corresponding frequency in the heating cavity according to the electromagnetic wave signal, so as to heat the object to be processed in the heating cavity; and
   a signal processing and measurement and control circuit, electrically connected with the electromagnetic generating module and disposed outside the cylinder body,
   wherein the cylinder body is formed by an upper cover, a bottom plate, a rear cover, and two lateral side plates, so that the heating cavity defined in the cylinder body is provided with a front side opening;
   wherein the heating device further comprises a door body configured to open and close the front side opening; and
   wherein the signal processing and measurement and control circuit is located on a rear side of the rear cover.

2. The heating device according to claim 1, wherein
   a housing plate is disposed on the rear side of the rear cover, an accommodating cavity is defined between the housing plate and the rear cover, and the signal processing and measurement and control circuit is disposed in the accommodating cavity; and
   through holes are formed on a rear plate of the housing plate opposite to the rear cover so as to allow heat generated by the signal processing and measurement and control circuit to be dissipated by the through holes.

3. The heating device according to claim 2, wherein
   the heating device is placed behind a storage compartment of a refrigerator, the rear plate of the housing plate is adjacent to an air supply duct of the refrigerator, and the through holes on the rear plate are communicated with the air supply duct, so as to quickly reduce a temperature of the signal processing and measurement and control circuit by a cooling air flow in the air supply duct.

4. The heating device according to claim 1, wherein
   the signal processing and measurement and control circuit is integrated on a circuit board.

5. The heating device according to claim 4, wherein
   the circuit board is fixed on a rear surface of the rear cover by screws, and the rear cover is tightly connected with the bottom plate, the upper cover and the two lateral side plates by screws.

6. The heating device according to claim 1, wherein
   the door body comprises a metal end plate configured to block the front side opening to seal the heating cavity and conductive connectors electrically connected with the metal end plate, and the conductive connectors are configured to be electrically connected with the cylinder body at least when the door body is in a closed state in which the door body seals the front side opening, so that when the door body is in the closed state, the cylinder body and the door body form a continuously conductive shielding body.

7. The heating device according to claim 1, further comprising:
   an antenna housing, disposed in the cylinder body and configured to separate an inner space of the cylinder body into a heating chamber and an electrical appliance chamber, wherein the object to be processed and the radiating antenna are respectively disposed in the heating chamber and the electrical appliance chamber.

8. A refrigerator, comprising:
   a cabinet, in which at least one storage compartment is defined; and
   a heating device according to claim 1, disposed in one of the at least one storage compartment.

9. The refrigerator according to claim 8, wherein
   a compressor bin configured to place a compressor is further defined in the cabinet; and
   the electromagnetic generating module of the heating device is disposed in the compressor bin and is connected with the signal processing and measurement and control circuit by a radio frequency cable and a signal transmission cable, and then is electrically connected with an antenna pole plate by the signal processing and measurement and control circuit.

10. A refrigerator, comprising:
   a cabinet, in which at least one storage compartment is defined; and a heating device disposed in one of the at least one storage compartment, the heating device comprising:
  a cylinder body, in which a heating cavity is defined and configured to place an object to be processed;
  an electromagnetic generating module, configured to generate an electromagnetic wave signal;
  a radiating antenna, electrically connected with the electromagnetic generating module to generate electromagnetic waves of a corresponding frequency in the heating cavity according to the electromagnetic wave signal, so as to heat the object to be processed in the heating cavity; and
  a signal processing and measurement and control circuit, electrically connected with the electromagnetic generating module and disposed outside the cylinder body,
wherein a compressor bin configured to place a compressor is further defined in the cabinet; and
wherein the electromagnetic generating module of the heating device is disposed in the compressor bin and is connected with the signal processing and measurement and control circuit by a radio frequency cable and a signal transmission cable, and then is electrically connected with an antenna pole plate by the signal processing and measurement and control circuit.

* * * * *